United States Patent
Schumacher et al.

(10) Patent No.: US 9,455,587 B2
(45) Date of Patent: Sep. 27, 2016

(54) DEVICE AND METHOD FOR CHARGING A BATTERY

(71) Applicant: Dialog Semiconductor GmbH, Kirchheim/Teck-Nabern (DE)

(72) Inventors: Otto Schumacher, Dachau (DE); Olivier Girard, Munich (DE); Joao Paulo Trierveiler Martins, Germering (DE); Hartmut Sturm, Germering (DE); Fabio Rigoni, Munich (DE)

(73) Assignee: Dialog Semiconductor GmbH, Kirchheim/Teck-Nabern (DE)

( * ) Notice: Subject to any disclaimer, the term of this patent is extended or adjusted under 35 U.S.C. 154(b) by 120 days.

(21) Appl. No.: 14/287,358

(22) Filed: May 27, 2014

(65) Prior Publication Data

US 2015/0102779 A1    Apr. 16, 2015

(30) Foreign Application Priority Data

Oct. 11, 2013    (EP) .................................... 13188287

(51) Int. Cl.
*H02J 7/00*    (2006.01)
*H02J 7/34*    (2006.01)

(52) U.S. Cl.
CPC .............. *H02J 7/0052* (2013.01); *H02J 7/007* (2013.01); *H02J 7/0093* (2013.01); *H02J 7/345* (2013.01)

(58) Field of Classification Search
CPC .... H02J 7/0052; H02J 7/0007; H02J 7/0093; H02J 7/345
USPC ................................ 320/139, 141, 145, 162
See application file for complete search history.

(56) References Cited

U.S. PATENT DOCUMENTS

| | | | |
|---|---|---|---|
| 5,481,174 A | 1/1996 | Martin et al. | |
| 5,694,023 A * | 12/1997 | Podrazhansky | H01M 10/44 320/129 |
| 5,889,385 A * | 3/1999 | Podrazhansky | H02J 7/0016 320/130 |
| 6,094,033 A * | 7/2000 | Ding | H01M 10/44 320/132 |
| 6,097,172 A * | 8/2000 | Podrazhansky | H02J 7/0093 320/107 |
| 6,232,750 B1 * | 5/2001 | Podrazhansky | H02J 7/0093 320/139 |
| 8,242,738 B2 * | 8/2012 | Barsukov | G01R 31/3651 320/106 |
| 8,749,193 B1 * | 6/2014 | Sullivan | H02J 1/08 307/10.7 |
| 2001/0035740 A1 * | 11/2001 | Palanisamy | B60L 11/1851 320/147 |
| 2003/0206021 A1 * | 11/2003 | Laletin | G01R 31/3631 324/426 |
| 2005/0225299 A1 | 10/2005 | Petrovic | |
| 2005/0248314 A1 * | 11/2005 | James | G01R 31/3648 320/131 |
| 2011/0285356 A1 * | 11/2011 | Maluf | H02J 7/0052 320/139 |
| 2011/0316548 A1 * | 12/2011 | Ghantous | G01R 31/3637 324/427 |
| 2012/0200266 A1 * | 8/2012 | Berkowitz | B60L 11/1861 320/139 |
| 2014/0084846 A1 * | 3/2014 | Berkowitz | H02J 7/0093 320/107 |
| 2015/0377976 A1 * | 12/2015 | Maluf | G01R 31/3679 702/63 |
| 2015/0380957 A1 * | 12/2015 | Ghantous | H02J 7/0052 320/134 |

FOREIGN PATENT DOCUMENTS

WO    WO 97/07582    2/1997

OTHER PUBLICATIONS

European Search Report 13188287.0-1806 Mailed: Mar. 3, 2014.
* cited by examiner

*Primary Examiner* — Phallaka Kik
(74) *Attorney, Agent, or Firm* — Saile Ackerman LLC; Stephen B. Ackerman (57) ABSTRACT

A method for charging a battery is provided, wherein current pulses are supplied to the battery, wherein each pulse is followed by a rest period during which no current is supplied to the battery, and wherein the state of charge of the battery is determined during the rest period.

22 Claims, 8 Drawing Sheets

DEVICE AND METHOD FOR CHARGING A BATTERY

TECHNICAL FIELD

The present disclosure relates to a method and a device for charging batteries.

BACKGROUND

Some known battery chargers use a two-phase method for charging batteries. Therein, a constant current (CC) phase is followed by a constant voltage (CV) phase. During the CC phase, the biggest part of the charge is put into the battery. Still, the CV phase consumes a fairly large amount of time (approx. 30% of approx. 2 h total charging time for a standard 1000 mAh Li-ion battery). However, during the CV phase, only about 10% of the total charge is loaded into the battery. Thus, conventional battery charging methods and devices spend a large amount of time loading a small amount of charge into the battery, which significantly extends the overall charging time of the battery.

There is thus a need to provide a method and a device which enables to shorten the battery charging time.

SUMMARY

According to an aspect, a method for charging a battery is provided, wherein current pulses are supplied to the battery for charging the battery. In the present disclosure, the term "battery" encompasses all types of charge storage devices. Therein, each pulse is followed by a rest period during which no current is supplied to the battery. Thus, a controlled amount of charge can be injected into the battery cell during a single pulse. The current pulses are preferably pulses of constant current value. According to some embodiments, the supplied current value may change during the duration of the applied pulse. The state of charge of the battery is determined during the rest period. This allows an accurate determination of the battery's state, as no current is supplied to the battery during the rest period which could affect the determination of the battery's state. Thus, e.g. a measured battery voltage is not distorted by a voltage drop at a parasitic resistance within the charging circuit which would occur if current was flowing within the charging circuit during a battery voltage measurement. The pulse duration may be adapted to the state of charge of the battery. Thus, the amount of charge injected per pulse can be adapted to the state of the battery in order to prevent overcharging if the battery is close to its fully-charged state.

According to embodiments, the battery voltage may be measured during a rest period between two pulses. It may be determined that the battery is fully charged if the measured battery voltage is higher than or equal to a predetermined voltage threshold. The predetermined voltage threshold may correspond to a target battery voltage for a fully-charged battery, or it may be set a predetermined distance below the target battery voltage. With the voltage threshold slightly below the target battery voltage, overcharging of the battery can be prevented. When the measured battery voltage is slightly below the voltage threshold during a rest period, then the battery voltage will likely be raised above the voltage threshold with the next current pulse that is supplied to the battery.

Therein, a pulse duration of a pulse of constant current or a pulse intensity may be determined according to the battery voltage measured in the rest period preceding the pulse, wherein the pulse intensity may be set by determining a charge current value which is applied during the pulse duration. Thus, the amount of charge that is injected into the battery can be adjusted for each pulse by adjusting the pulse duration or the pulse intensity according to the battery's state of charge. For a battery that is already close to being fully charged, the duration of the constant current pulses can be shortened or the current can be lowered in order to prevent overcharging. For a battery that is at a lower charge state, the duration of the constant current pulses can be lengthened in order to inject more charge per pulse into the battery and thus to decrease the overall charging time. According to embodiments, the pulse duration and/or pulse intensity may alternatively be determined according to the battery voltage measured in a previous rest period, not necessarily the rest period immediately preceding the pulse.

According to embodiments, the pulse duration or pulse intensity may be set according to a difference between the measured battery voltage in the rest period preceding the pulse and the predetermined voltage threshold, e.g. the pulse duration may be set proportional to the difference between the measured battery voltage in the rest period preceding the pulse and the target battery voltage. The predetermined voltage threshold may be a target battery voltage for a fully-charged battery. Thus, the pulse duration and the charge injected per pulse may be reduced as the battery voltage gets closer to its target value.

Therein, the battery voltage may be measured towards the end of a rest period. This allows sufficient time for the battery and a measurement circuitry to relax to a stable voltage value so that the battery voltage can be measured with high accuracy.

According to embodiments, the battery voltage may be recorded, e.g. by the measurement circuit, during the rest period, and a relaxation time may be determined, which relaxation time corresponds to the time from the start of the rest period until the battery voltage drops below the predetermined voltage threshold. Thus, it is not necessary to wait until the voltage at the measuring node has settled to a stable value. Instead, the voltage relaxation behavior at the start of a rest period can be used in order to determine a relaxation time value that indicates a state of charge of the battery and that can be used for controlling the charging process. Further, the predetermined voltage threshold that is used as a criterion for determining the relaxation time may be the target battery voltage for a fully-charged battery or may be set at a voltage value slightly below the target battery voltage.

Therein, the pulse duration may be set according to an inverse relation to the determined relaxation time, e.g. inversely proportional to the determined relaxation time. If the measured voltage quickly relaxes below the predetermined voltage threshold, the relaxation time is short and it is assumed that the battery is only partly charged. Thus, the pulse duration may be set to a fairly large value so that a large amount of charge is injected with the next constant current pulse. With a large amount of charge injected per pulse, the overall charging time can be shortened. If the measured voltage takes a longer time to relax below the predetermined voltage threshold, it is assumed that the battery is nearing a fully-charged state. The pulse duration may be shortened in order to inject less charge into the battery per pulse in order to prevent overcharging.

According to embodiments, a constant current may be supplied continuously to the battery during a first charging phase, until the measured battery voltage during the current supply reaches the predetermined voltage threshold. Thus, a large amount of charge can be quickly and efficiently loaded into the battery during the constant current charging phase. Current pulses, wherein each pulse is followed by a rest period during which no current is supplied to the battery, may then be supplied to the battery in a second charging phase. Preferably, the supplied current value is constant for the duration of a pulse. As mentioned above, the state of the battery can be accurately monitored during the rest periods between current pulses in the second charging phase and overcharging can be prevented.

Embodiments further relate to a battery charging device, comprising a power supply unit adapted to supply a constant current to a battery at a predetermined current value, and a control unit adapted to control the current supply to the battery such that current pulses are supplied to the battery. Therein, each pulse is followed by a rest period during which no current is supplied to the battery. The current pulses are preferably pulses of constant current value. According to some embodiments, the supplied current value may change during the duration of the applied pulse. The control unit is further adapted to determine the state of charge of the battery during the rest period. This allows an accurate determination of the battery's state, as no current is supplied to the battery during the rest period. Thus, e.g. a measured battery voltage is not distorted by a voltage drop at a parasitic resistance within the battery or the charging circuit which would occur if current was flowing within the charging circuit during a battery voltage measurement.

The control unit may further be adapted to measure the battery voltage during a rest period between two pulses. The control unit may determine that the battery is fully charged if the measured battery voltage is higher than or equal to a predetermined voltage threshold. The predetermined voltage threshold may be set equal to or slightly less than a target battery voltage for a fully-charged battery.

According to embodiments, the control unit may further be adapted to determine a pulse duration of a pulse of constant current and/or a pulse intensity according to the battery voltage measured in the rest period preceding the pulse. Since the amount of charge injected into the battery during a constant current pulse is proportional to the pulse duration, the amount of charge loaded into the battery can thus be adjusted according to the state of charge of the battery. According to embodiments, control unit may be adapted to determine the pulse duration and/or pulse intensity according to the battery voltage measured in a previous rest period, not necessarily the rest period immediately preceding the pulse.

According to embodiments, the control unit may further comprise an analog-to-digital converter (ADC) for measuring the battery voltage. The control unit may be adapted to perform the voltage measurement with the ADC converter at the end of a rest period. As the charge current is turned off at the start of a rest period, the circuit node at which the battery voltage is measured takes some time to settle to a stable voltage value. At the end of the rest period, this relaxation process has been completed and does not affect the battery voltage measurement. The control unit may further be adapted to determine a voltage difference between the measured battery voltage and the predetermined voltage threshold in order to determine a state of charge of the battery.

The control unit may further be adapted to determine a pulse duration of a pulse of constant current and/or a pulse intensity according to the voltage difference determined in the rest period preceding the pulse, e.g. proportional to the voltage difference. Thus, longer and/or more intense pulses can be applied if the battery voltage is still well away from predetermined voltage threshold, and the pulse duration and/or intensity can be reduced as the battery voltage approaches the predetermined voltage threshold.

According to embodiments, the control unit may further comprise an analog comparator for comparing the battery voltage to a predetermined voltage threshold. The control unit may be adapted to measure a relaxation time from the start of a rest period until the time that the analog comparator determines that the battery voltage has reached a predetermined voltage threshold, which may e.g. correspond to a target battery voltage for a fully-charged battery. Thus, the relaxation behavior of the node at which the battery voltage is measured may be used for the determination of a relaxation time value which indicates the state of charge of the battery. The faster the battery voltage drops below the predetermined voltage threshold, the lower the charge state of the battery.

Therein, the control unit may further be adapted to set the pulse duration and/or the pulse intensity according to an inverse relation to the determined relaxation time, e.g. inversely proportional to the determined relaxation time. Thus, charge can be injected quickly into the battery while the battery voltage is well below the predetermined voltage threshold, and overcharging can be prevented by reducing the amount of charge that is injected per pulse when the battery voltage approaches the predetermined voltage threshold.

According to a further aspect, a method for charging a battery is described, wherein current pulses are supplied to the battery, wherein each pulse is followed by a rest period during which no current is supplied to the battery, and wherein the state of charge of the battery is determined during the rest period.

According to another aspect, a battery charging device is described, wherein a battery charging device, comprising a power supply unit adapted to supply a constant current to a battery at a predetermined current value, a control unit adapted to control the current supply to the battery such that current pulses are supplied to the battery, wherein each pulse is followed by a rest period during which no current is supplied to the battery, and wherein the control unit is further adapted to determine the state of charge of the battery during the rest period.

The present description is mainly directed at embodiments of a method. However, it is to be understood, that any features described in terms of method steps may also be implemented as device features and vice versa.

BRIEF DESCRIPTION OF THE DRAWINGS

Various aspects are explained below in an exemplary manner with reference to the accompanying drawings, wherein.

DESCRIPTION

Figure 1:
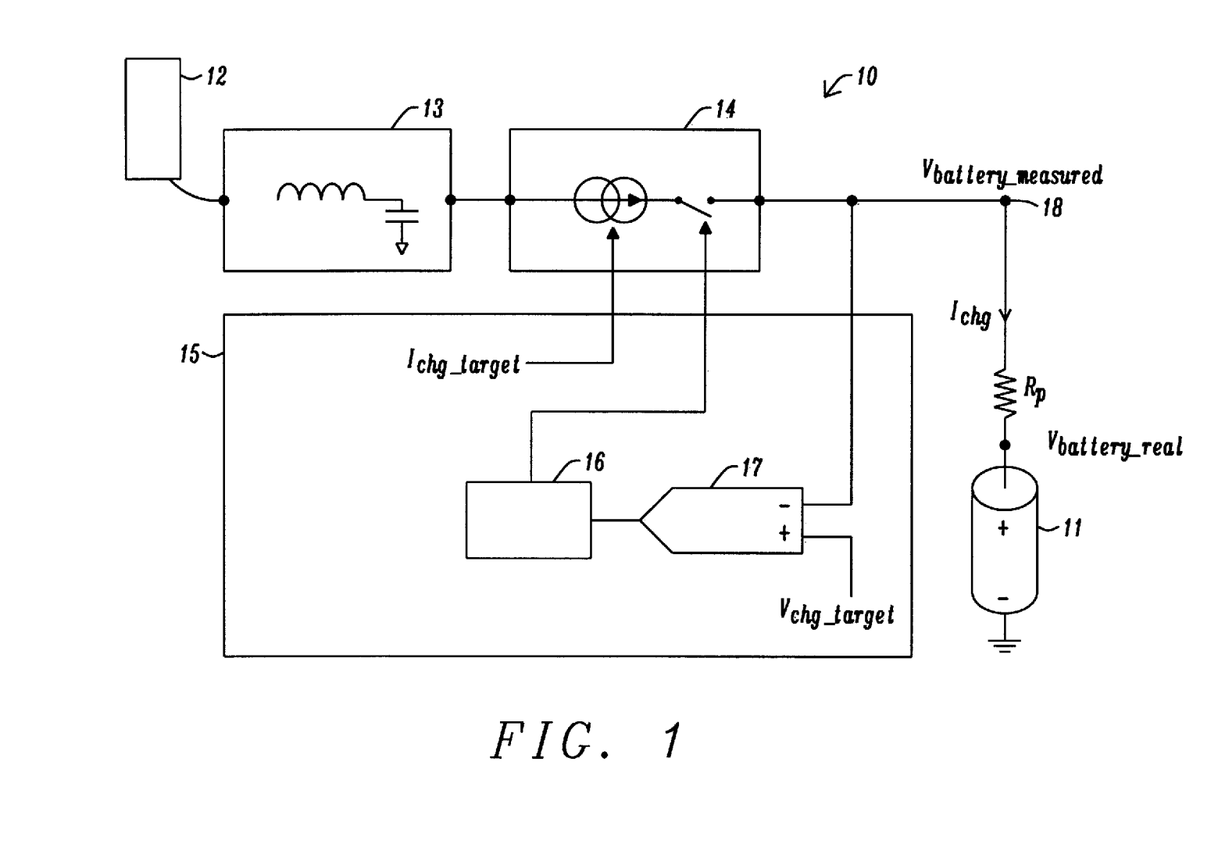
FIG. 1 shows an embodiment of a battery charging device.

According to an embodiment, a battery charger 10 as shown in FIG. 1 is provided which can be used for charging a battery cell 11. In the present description, the terms "battery" and "battery cell" encompass any type of charge storage device, such as (rechargeable) batteries, accumulators, capacitor-based charge storage devices and the like. The battery charger 10 may be connected to a power supply 12, such as a USB port of an electronic device or a mains power supply, and a power converter 13 may be provided for converting the voltage provided by the power supply 12 to a voltage that is to be supplied to the battery cell 11, which is e.g. a Li-ion battery.

A linear charger 14 is provided which transforms the power supplied by the power converter 13 into a constant current at the target value $I_{chg\_target}$ and supplies the charge current $I_{og}$ to the battery cell 11. A control unit 15 controls the operation of the linear charger 14 and further comprises a control logic 16 for controlling the current value supplied to the battery cell 11 and an analog comparator 17 for outputting the difference between the measured battery voltage $V_{battery\_measured}$ and a target battery voltage $V_{chg\_target}$. The voltage measurement by the analog comparator 17 is performed at a node 18 within the current supply path from the linear charger 14 to the battery 11.

Figure 2:
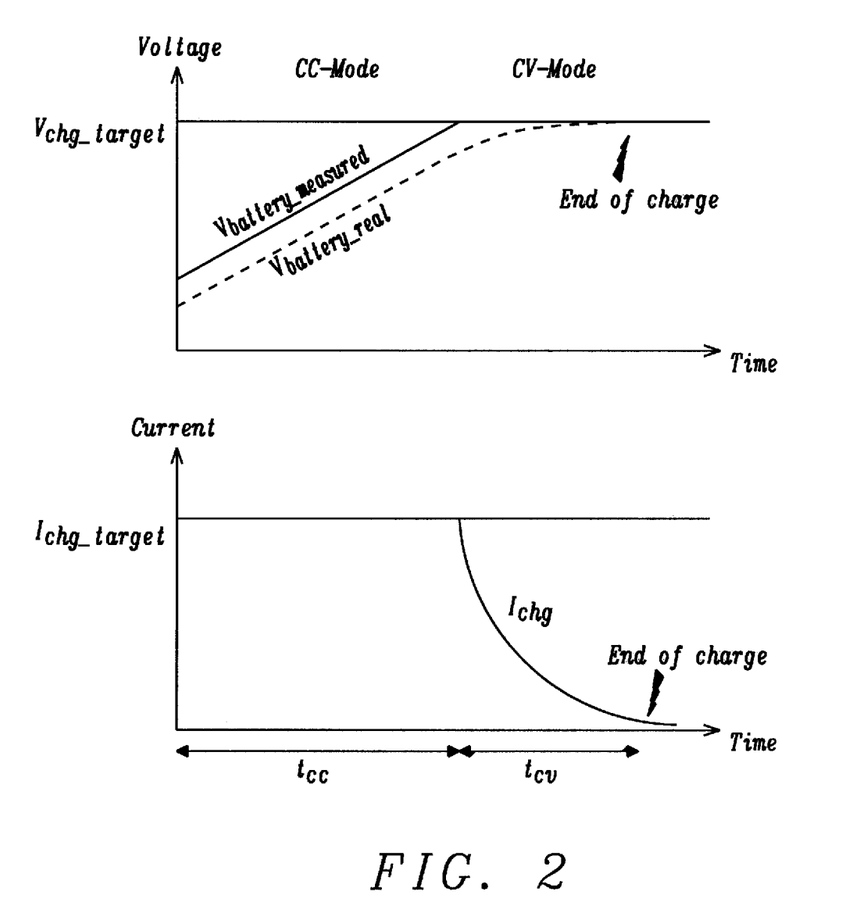
FIG. 2 shows an example of a prior art battery charging method.

FIG. 2 shows diagrams for both current and voltage during constant current (CC) and constant voltage (CV) charging modes. As shown in the voltage diagram of FIG. 2, during the CC charging mode, the measured battery voltage $V_{battery\_measured}$ (solid line) raises until it reaches a target battery voltage value $V_{chg\_target}$. Then, the charging process is switched to a CV charging mode, wherein the charging current is reduced as the difference between the constant charging voltage and the actual battery cell voltage $V_{battery\_real}$ (dashed line) decreases. The charging process is ended when the charging current $I_{chg}$ has substantially dropped to zero and when the actual battery cell voltage $V_{battery\_real}$ has reached the target value $V_{chg\_target}$.

It must be noted that, in the method of FIG. 2, the battery voltage measurement is performed during the charging process, i.e. when a current is flowing through the linear charger 14 and into the battery cell 11. Thus, the measured battery voltage $V_{battery\_measured}$ does not reflect the actual battery voltage $V_{battery\_real}$, but also contains a voltage drop at any parasitic resistances $R_{parasitic}$ within the battery cell 11 and within the charging circuit between the measuring node 18 and the battery cell 11 (see FIG. 1). Thus, the measured battery voltage $V_{battery\_measured}$ is always slightly higher than the actual battery cell voltage $V_{battery\_real}$. Since the parasitic resistances $R_{parasitic}$ are generally not known and change with temperature, age and other parameters of the system, it is generally not feasible to calculate $V_{battery\_real}$ from $V_{battery\_measured}$. However, continuing the CC phase when the measured battery voltage $V_{battery\_measured}$ has already reached the target battery voltage $V_{chg\_target}$ is risky, since the battery cell could be damaged if it is overcharged.

In order to prevent an overcharging of the battery cell, the charging mode is switched to CV mode when the measured battery voltage $V_{battery\_measured}$ reaches the target battery voltage $V_{chg\_target}$. Then, as seen in the current diagram of FIG. 2, the charging current $I_{chg}$ is reduced over time as the battery voltage approaches its target value $V_{chg\_target}$ and as the difference between the constant charging voltage and the battery voltage $V_{battery\_real}$ decreases. Due to the smaller current flowing in the charging system during the CV mode, the voltage drop at the parasitic resistance decreases and thus the difference between the measured battery voltage $V_{battery\_measured}$ and the actual battery voltage $V_{battery\_real}$ decreases. When the current drops below a predetermined current level, the battery is deemed to be fully charged and the charging procedure is ended. While the CV mode typically takes about 30% of the overall charging time, it only contributes about 10% of the charge loaded onto the battery due to the rapid decrease of the charge current $I_{chg}$ with time.

Figure 3:
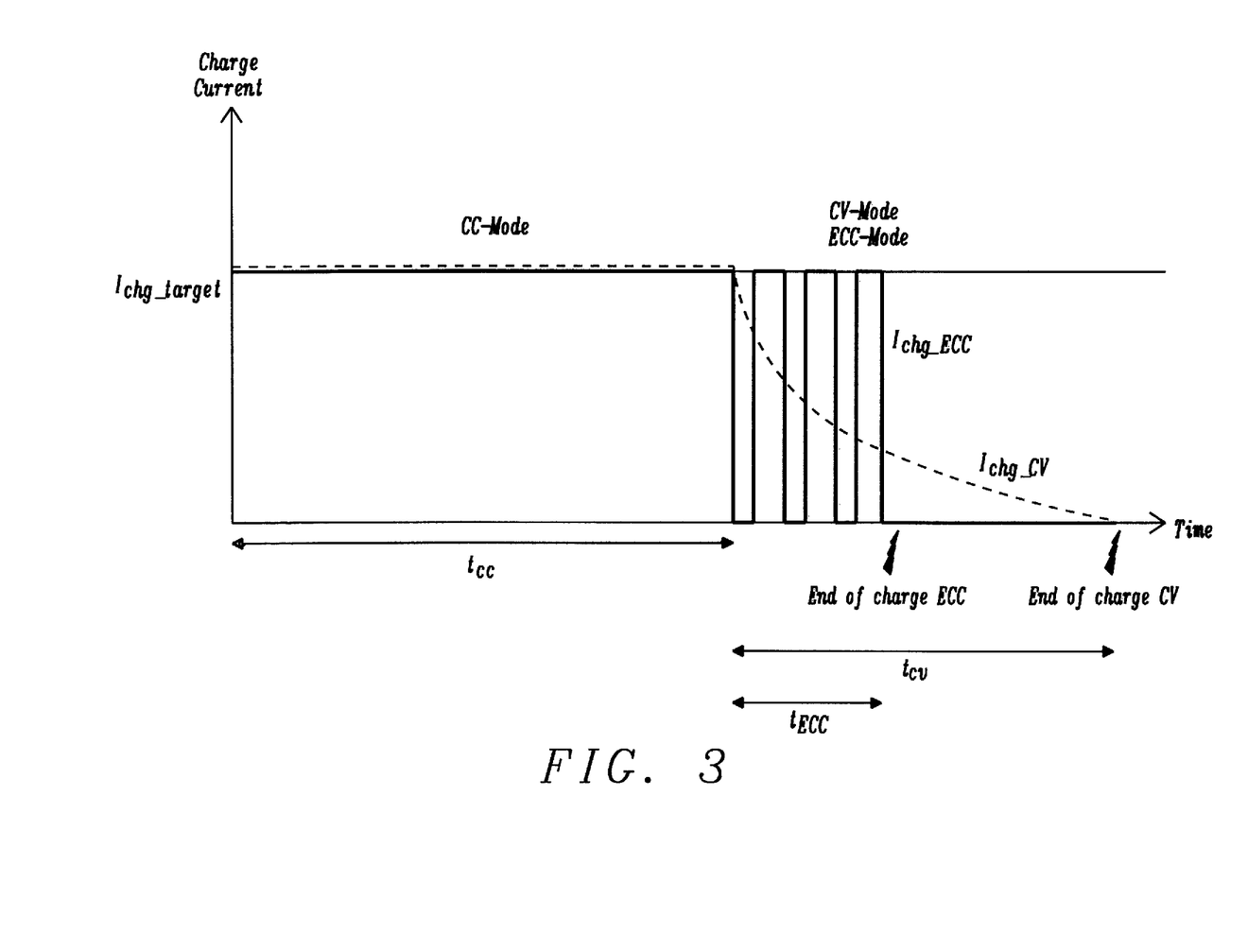
FIG. 3 shows a comparison of an embodiment of the claimed charging method with the prior art charging method shown in FIG. 2.

As shown in FIG. 3, the claimed method differs from the charging method of FIG. 2 in that an extended CC (ECC) mode is used instead of the CV mode. During the ECC mode, short current pulses are applied to the battery cell 11, wherein the charging voltage may be higher than the charging voltage during the conventional CC and CV modes. During a pulse, the charging current $I_{chg}$ is preferably kept constant, but according to some embodiments, the charging current $I_{chg}$ may be varied during a pulse. No charging current $I_{chg}$ is supplied during rest periods between pulses. Thus, a controlled amount of charge is injected into the battery cell with each current pulse, while the state of charge of the battery can be monitored during the rest periods between pulses. The cycle of charge injection and rest period can be repeated until the battery is fully charged. During the rest period, as there is no current flowing in the charging system, the battery's state of charge can be determined accurately without the above-described voltage drop at a parasitic resistance within the battery and/or within the charging system affecting a voltage measurement.

As shown in FIG. 3, the duration $t_{CC}$ of the CC charging mode is the same for both depicted methods. The duration $t_{ECC}$ of the proposed ECC mode (solid line), wherein controlled amounts of charge can be injected into the battery with each pulse, is shorter than the duration $t_{CV}$ of the CV charging mode (dashed line) until an end of charge state, EOC, is reached.

Figure 4:
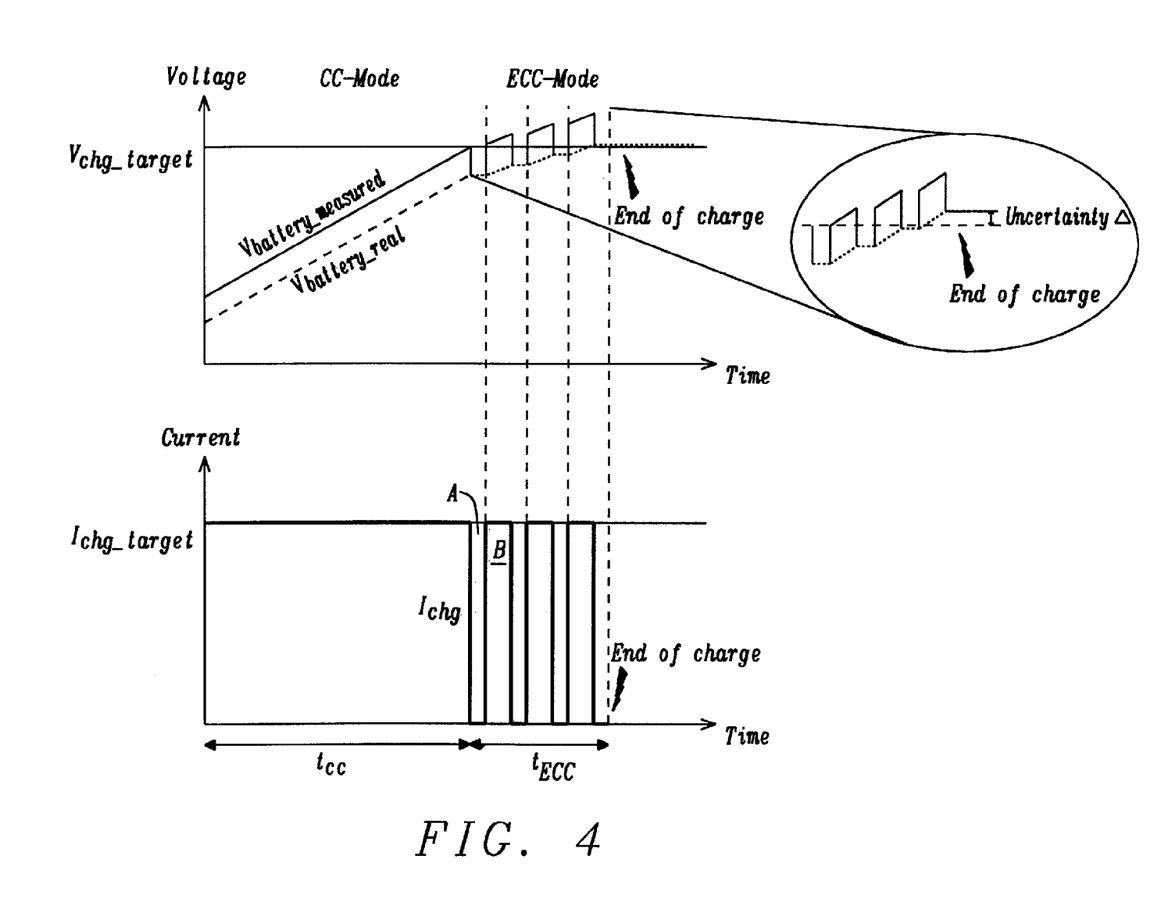
FIG. 4 shows current and voltage values during the embodiment of the charging method as shown in FIG. 3.

FIG. 4 shows voltage and current diagrams for the proposed ECC mode. During the ECC mode, pulses of charge (B) and rest periods (A) are applied alternately. In order to generate the charging pulses, such as e.g. constant current pulses, a voltage greater than the target voltage $V_{chg\_target}$ is applied to the battery 11. As explained above, the actual voltage applied to the battery ($V_{battery\_real}$, dashed line) is smaller than the measured voltage ($V_{battery\_measured}$, solid line) due to the voltage drop at the parasitic resistance $R_{parasitic}$ of the battery cell 11 and/or the charging device 14 when a charge current $I_{chg}$ is supplied to the battery cell 11. As already outlined in conjunction with FIG. 2, $$V_{battery\_measured} = V_{battery\_real} + I_{chg} * R_{parasitic},$$

wherein the parasitic resistance $R_{parasitic}$ is not known and may change with time, temperature, voltage, etc. Thus, it is not possible to accurately determine the actual battery voltage $V_{battery\_real}$ while current is flowing to/from the battery. During the rest periods, a more precise voltage measurement can be obtained, as no current is supplied to the battery and thus the measured battery voltage $V_{battery\_measured}$ corresponds to the actual battery voltage $V_{battery\_real}$.

In the embodiment shown in FIG. 4, the respective durations of the current pulses and the rest periods are constant throughout the whole ECC mode charging procedure and the charging is ended when the battery voltage $V_{battery\_measured}$ that is measured during the rest periods reaches the predetermined target value $V_{chg\_target}$. As already mentioned, for voltage measurements during the rest periods, $V_{battery\_measured} = V_{battery\_real}$.

As shown in the enlarged section of the voltage during ECC mode in FIG. 4, if the battery voltage $V_{battery\_measured}$ that is measured during the rest period A preceding the last current pulse B is only slightly smaller than the target battery voltage $V_{chg\_target}$, then the last current pulse may supply an excessive amount of charge to the battery such that the battery voltage is raised to $V_{chg\_target}+\Delta$.

In order to prevent this overcharging, in an embodiment the ECC mode may be ended if the measured battery voltage reaches a predetermined value that is slightly below $V_{chg\_target}$. In this case, the battery may not be fully charged at the end of the ECC mode charging process. Then, a short auxiliary CV phase may be performed in order to reach the target battery voltage $V_{chg\_target}$. Even though the current in this short auxiliary CV phase will be very low and thus charge will be injected into the battery at a slow rate, the amount of charge that needs to be injected into the battery after performing the ECC mode as described above is so small that the auxiliary CV phase will not take an overly long time. Further, the low charge current during the short auxiliary. CV phase means that the voltage drop at the parasitic resistance of the battery and the charging system will be low, so that the measured battery voltage will be close to the actual battery voltage. Thus, the state of the battery can be monitored accurately during the short auxiliary CV phase and overcharging of the battery can be prevented.

Figure 5:
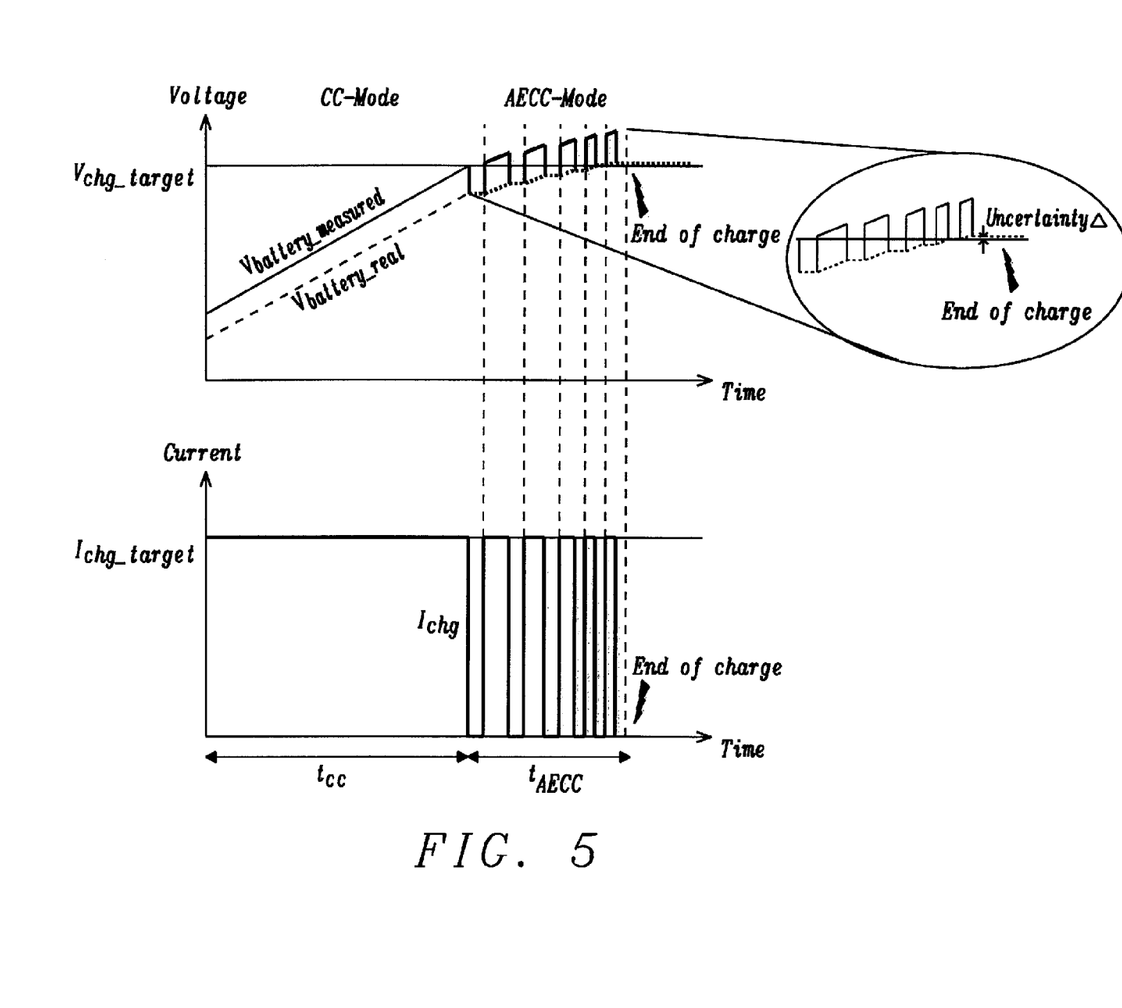
FIG. 5 shows current and voltage values during a further embodiment of the charging method.

According to embodiments, the risk of applying a voltage over the charging limit to the battery during the charging pulses of the ECC phase may be reduced by employing an adaptive method for determining the pulse duration and/or pulse intensity of each current pulse. As the battery voltage measured during the resting time approaches the target voltage, the duration and/or the intensity of the charging pulses is reduced. The aim is to decrease the charge injected in the battery during each charging pulse as the charging progresses and the battery voltage comes close to its target value and, with this, to reduce the risk of exceeding the maximum capacity of the battery. Voltage and current diagrams for an example implementation of such an adaptive ECC mode are shown in FIG. 5.

According to embodiments, two different methods of determining the battery voltage can be used:
1. a voltage measurement'done by an analog-to-digital converter during the rest period; or
2. a time measurement of the time the analog comparator 17 (see FIG. 1) takes to reach a predetermined output value during the rest period.

Figure 6:
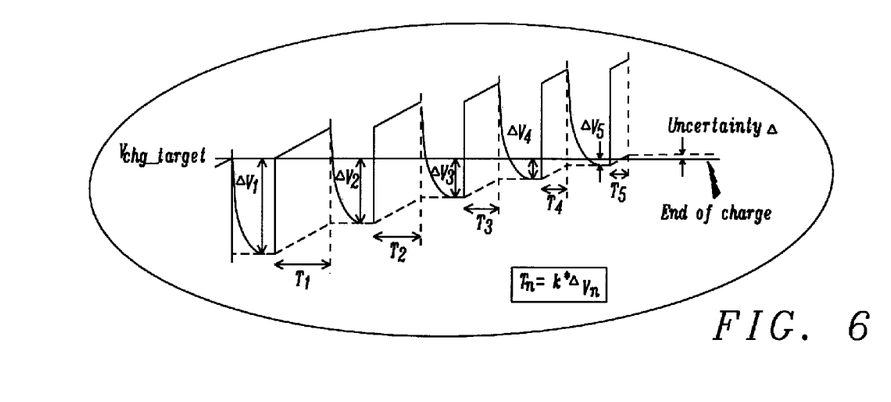
FIG. 6 shows an enlarged section of the voltage values during the second charging phase as shown in FIG. 5.

According to the first method, the duration and/or the intensity of each pulse may be determined according to the battery voltage that has been determined during the rest period preceding the respective pulse. FIG. 6 shows a voltage diagram of an embodiment of a charging method. This method may be performed with a charging device 10 that uses an ADC for measuring the battery cell voltage at node 18, wherein the ADC may be provided instead of the analog comparator 17 shown in FIG. 1. The solid line in FIG. 6 shows the measured value for the battery voltage $V_{battery\_measured}$, wherein it can be seen that, after the rest period starts and the current $I_{chg}$ flowing to the battery 11 is reduced to zero, the node 18 at which the control unit measures the battery voltage $V_{battery\_measured}$ using the ADC needs a certain time to settle to a stable voltage value. With the ADC measurement method, the battery voltage is measured by the ADC at the end of a resting period after the voltage has settled to its final value so that the measured battery voltage $V_{battery\_measured}$ is substantially equal to the actual battery voltage $V_{battery\_real}$.

As shown in FIG. 6, a difference $\Delta_{V_n}$ between the measured value of the battery voltage $V_{battery\_measured}$ and the target battery voltage $V_{chg\_target}$ can be determined for each rest period n. With this value, the state of charge of the battery can be estimated and the duration $T_n$ of the next charging pulse can be calculated accordingly. For example, a linear relationship $T_n = k * \Delta_{V_n}$ for the charging pulse duration $T_n$ and the voltage difference $\Delta_{V_n}$ can be implemented, wherein k is a constant. The duration of the rest periods may be kept constant in order to ensure that the measured voltage settles on a value equal to $V_{battery\_real}$ during each rest period. As the charging current is constant throughout the pulses of the ECC mode, the amount of charge injected into the battery cell 11 with each pulse is dependent on the pulse duration $T_n$. Thus, the amount of charge injected into the battery cell 11 with each pulse is proportional to the difference between the actual battery voltage $V_{battery\_real}$ and the target voltage $V_{chg\_target}$, such that, as the battery is getting closer to being fully charged, the amount of charge that is injected per pulse is decreased with each pulse. As shown in FIG. 6, this leads to a smaller amount of overcharging when compared with the ECC mode with constant pulse duration as shown in FIG. 4.

Alternatively, the charging current value during a charging pulse may be adjusted according to the voltage difference $\Delta_{V_n}$ and charging pulses of constant duration and decreasing current can be applied as the battery is getting closer to being fully charged. Therein, the current value applied during a single charging pulse can be kept constant, wherein the current value applied during consecutive pulses may decrease with each pulse. Further, both the charging current, i.e. the pulse intensity, and the pulse duration can be adjusted according to the voltage difference $\Delta_{V_n}$.

Figure 7:
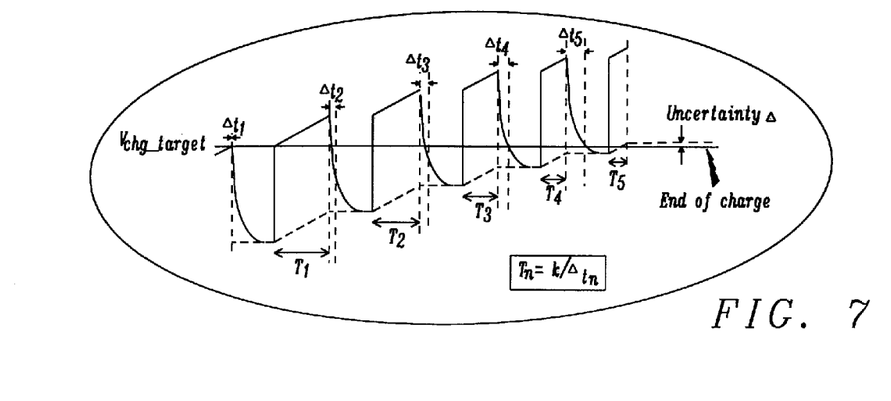
FIG. 7 shows a further embodiment of the charging method.
Figure 8:
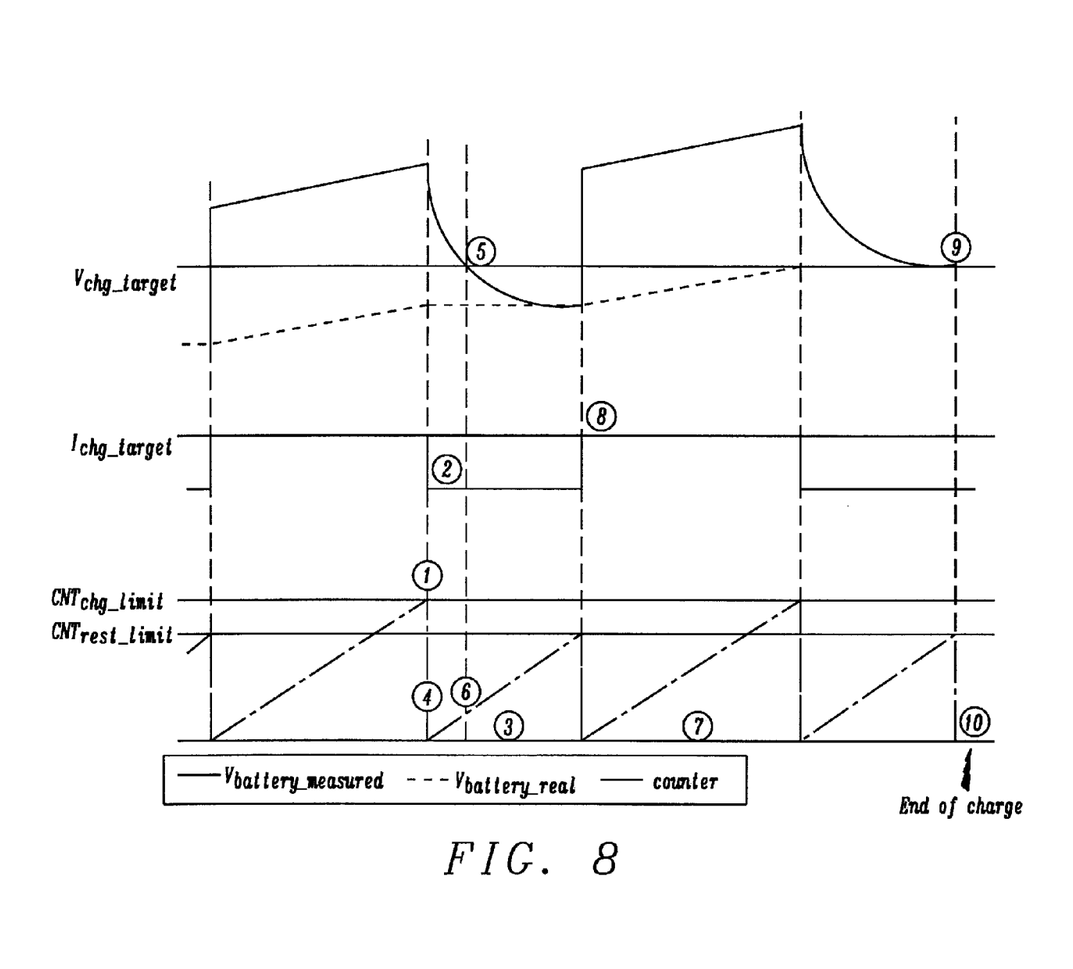
FIG. 8 shows an example implementation of an embodiment of the charging method.

According to the second method, a timer of the control unit 16 and the analog comparator 17 shown in FIG. 1 are used in order to measure the time it takes from the moment when the linear charger 14 is turned off and the current is reduced to zero to the time that $V_{battery\_measured}$ reaches or becomes lower than $V_{chg\_target}$, as illustrated in FIGS. 7 and 8.

As shown in FIG. 8, when a charging pulse ends (1), the current to the battery is reduced to zero (2) and a rest period starts (3). Within the control unit 16, a timer is used to monitor the duration of the rest period and a timer is used to measure the time from the start of the resting period (1) to the moment when the measured voltage $V_{battery\_measured}$ reaches the target value $V_{chg\_target}$ (5-6). Both measurements may be performed using the same timer. Based on this measured relaxation time, the state of charge of the battery can be estimated and the duration and/or the intensity of the following pulse (7) can be calculated. After the rest period, another constant current charging pulse starts (8), wherein the duration $T_n$ and/or the intensity of the pulse is set to the value calculated during the preceding rest period. If, at the end of a rest period, the measured battery voltage $V_{battery\_measured}$ is still greater than the target value $V_{chg\_target}$ (9), End of Charge (EOC) is reached (10).

The closer the actual battery voltage $V_{battery\_real}$ is to the target battery voltage $V_{chg\_target}$, the longer it will take for the measured battery voltage $V_{battery\_measured}$ to drop below $V_{chg\_target}$. Hence, as shown in FIG. 7, the time $\Delta_{tn}$ taken for the measured battery voltage $V_{battery\_measured}$ to drop below $V_{chg\_target}$ is short when the battery voltage is far below its target voltage and increases as the battery voltage increases. In order to ensure that decreasing amounts of charge are injected with each pulse as the battery voltage gets close to its target value, the duration $T_n$ of a pulse of constant current may be set according to an inverse function of the measured time $\Delta_{tn}$, e.g. inversely proportional to the measured time $\Delta_{tn}$ such that $T_n = k/\Delta_{tn}$, wherein k is a constant. Similar adjustments can be performed for the pulse intensity.

If it is assumed that the relaxation behavior of the measuring node 18 (see FIG. 1) is independent of the charge state of the battery, from the start of the rest period, then the measured time $\Delta_{tn}$ will be inversely related to the voltage difference $\Delta_{Vn}$ between the actual battery voltage and the target battery voltage, as described in conjunction with the first method shown in FIG. 6. However, even if the relaxation behavior of the node 18 were dependent on the state of charge of the battery or would vary according to other factors, the measured time $\Delta_{tn}$ would still provide useful information about the state of charge of the battery, so that the charge injected with the next pulse can be determined according to the relaxation time $\Delta_{tn}$. Thus, as shown in FIG. 7, the amount of overcharging $\Delta$ that may occur with this second method is reduced in comparison with the ECC mode with constant pulse duration as shown in FIG. 4.

Figure 9:
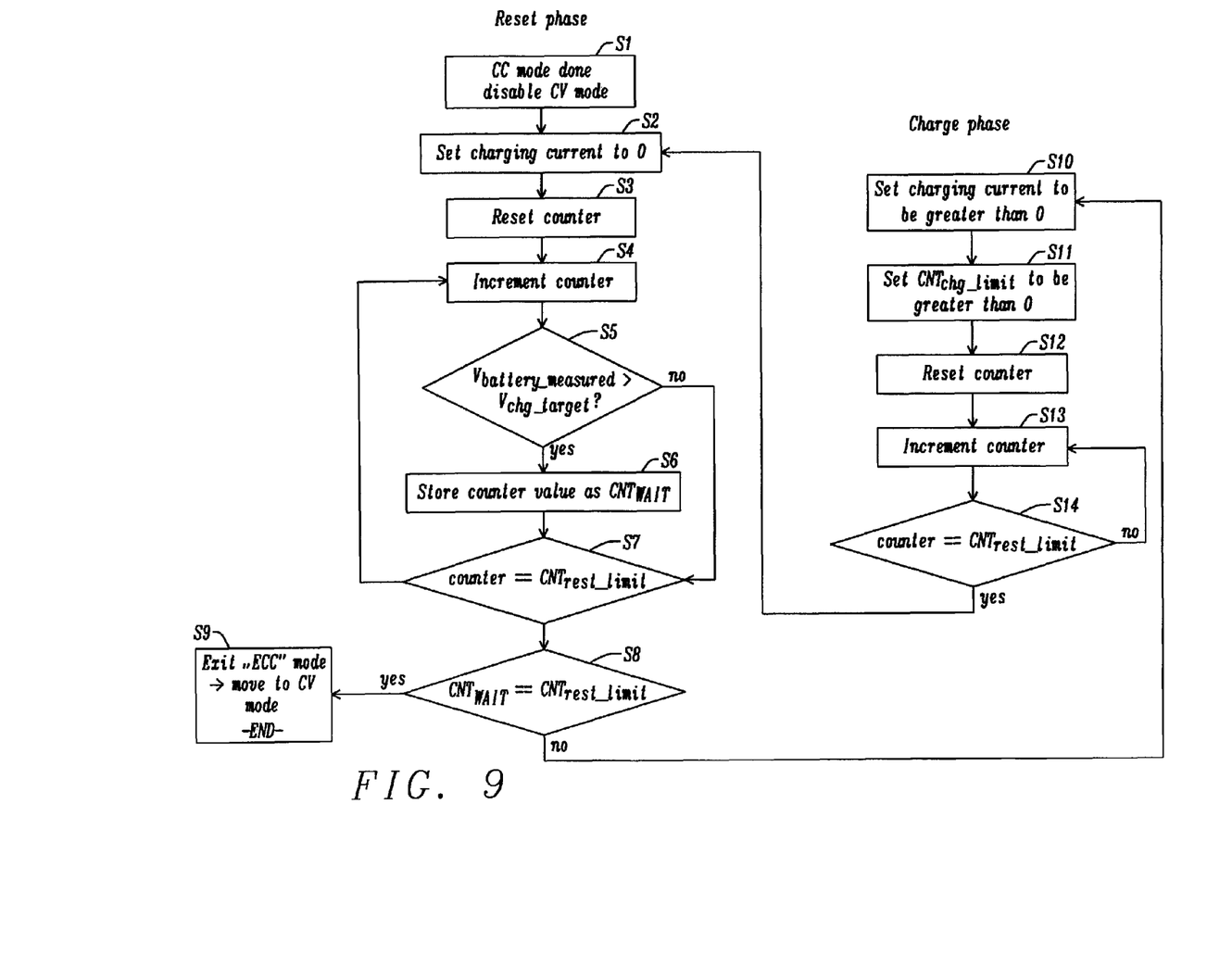
FIG. 9 shows a flow diagram of an embodiment of the charging method.

FIG. 9 shows an example embodiment of the control flow of the second method described above, as it may be implemented in the control unit 16 shown in FIG. 1. The control flow is structured in two distinct phases (see the dotted rectangles in FIG. 9), a rest phase and a charge phase, which respectively correspond to the rest period and the pulse of constant current shown e.g. in FIG. 5.

In step S1, the charging device is performing the CC charging mode until the measured value of the battery voltage has reached the target battery voltage, as shown in FIG. 5. With step S2, a rest period of the ECC charging mode starts (see FIG. 5), wherein the charging current $I_{chg}$ is set to zero and counters for measuring the rest period duration and the time $V_{battery\_measured}$ takes to reach $V_{chg\_target}$ are reset in step S3 and incremented in step S4. Therein, both the rest period duration and the time $V_{battery\_measured}$ takes to reach $V_{chg\_target}$ may be measured by the same counter.

When the measured battery voltage $V_{battery\_measured}$ reaches the target battery voltage $V_{chg\_target}$ (step S5), the counter value is stored as $CNT_{WAIT}$ to be used later in the estimation of the state of charge of the battery (step S6). When the counter reaches the time limit $CNT_{rest\_limit}$ of the rest period duration ("yes" in step S7), the rest period is ended. Otherwise, when the counter value is smaller than the time limit $CNT_{rest\_limit}$ of the rest period duration ("no" in step S7), the rest period continues and the processing returns to step S4, wherein the counter is incremented again.

In step S8, it is then determined whether, during the rest period, the measured battery voltage $V_{battery\_measured}$ has dropped below the target battery voltage $V_{chg\_target}$ at all, i.e. whether the counter value $CNT_{WAIT}$ stored in step S6 is smaller than the counter value $CNT_{rest\_limit}$ that determines the duration of the rest period. If $CNT_{WAIT}$ is equal to $CNT_{rest\_limit}$ ("yes" in step S8), i.e. if the measured battery voltage has not dropped below the target battery voltage $V_{chg\_target}$ during the rest period, then the ECC charging mode is exited. After this, the charger can either end the charging or go to a final CV mode of very short duration (step S9).

If $CNT_{WAIT}$ is not equal to $CNT_{rest\_limit}$ ("no" in step S8), then the charge phase of the control flow starts and the current is set to the target value (step S10). The pulse duration of the constant current pulse is determined according to the state of charge of the battery as described above in conjunction with FIGS. 7 and 8, and the corresponding counter limit $CNT_{chg\_limit}$ is set accordingly (step S11). The counter is reset (step S12) and, while the current pulse is supplied to the battery, the counter is incremented (step S13) until it reaches the pulse duration value determined in step S11 (step S14). When the current pulse has been applied for the determined duration ("yes" in step S14), the charge phase ends and the next rest phase is started by setting the charging current to zero (step S2) and determining the charge state of the battery (steps S3-S8).

The various embodiments of the proposed method and device are based on controlled pulses of increased voltage to allow charging in CC mode after the measured battery voltage (including the unknown resistive add-on) has reached the target battery voltage. The total charge time of a battery can be lowered significantly due to minimizing the time consumed by CV mode, as with the proposed method close to 100% of the total charge are put into the battery during CC mode. This allows exchanging a major part of the CV mode of a prior art charging method for a much faster extended CC mode.

As the current and voltage during a charge pulse are known and can be controlled with high accuracy, the charge that is put into the battery during a pulse can be determined. Further, the status of the battery can be monitored accurately due to the measurements being performed during the rest periods, wherein no parasitic resistances influence the measured battery voltage. Therefore, the next current pulse can be adjusted or the decision to stop the charging procedure can be taken based on measurements performed in the preceding rest period.

Further, the proposed method and device achieve a particularly fast charging compared to prior art methods and devices when the battery is not charged from 0% to 100%, but from an intermediate charge state, e.g. from 50%, to 100%. In prior art methods, charging from an intermediate charge state means that the lengthy CV mode makes up an even larger proportion of the overall charging time. The faster ECC mode of the proposed method thus achieves an even higher proportional time reduction of the overall charging time from the intermediate state to the fully-charged state of the battery.

It should be noted that the description and drawings merely illustrate the principles of the proposed methods and devices. It will thus be appreciated that those skilled in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the proposed methods and systems and the concepts contributed by the inventors to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

Finally, it should be noted that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

What is claimed:

1. A method for charging a battery comprising:
supplying current pulses to the battery, wherein each pulse is followed by a rest period during which no current is supplied to the battery;
determining the state of charge of the battery during the rest period;
comparing, using an analog comparator, the battery voltage to the predetermined voltage threshold; and
measuring a relaxation time from the start of the rest period until the time at which the analog comparator determines that the battery voltage has reached the predetermined voltage threshold.

2. The method according to claim 1, further comprising:
measuring the battery voltage during a rest period between two pulses; and
determining that the battery is fully charged if the measured battery voltage is higher than or equal to a predetermined voltage threshold.

3. The method according to claim 2, further comprising:
determining a pulse duration of a pulse of constant current or a charging current according to the battery voltage measured in the rest period preceding the pulse.

4. The method according to claim 3, wherein the pulse duration is set according to a difference between the measured battery voltage in the rest period preceding the pulse and the predetermined voltage threshold.

5. The method according to claim 2, wherein the battery voltage is measured towards the end of a rest period.

6. The method according to claim 2, wherein the battery voltage is recorded during the rest period, and wherein a relaxation time is determined, which relaxation time corresponds to the time from the start of the rest period until the battery voltage drops below the predetermined voltage threshold.

7. The method according to claim 6, wherein the pulse duration and/or the charging current is set according to an inverse relation to the determined relaxation time.

8. The method according to claim 2, wherein a constant current is supplied continuously to the battery during a first charging phase, until the measured battery voltage during the current supply reaches the predetermined voltage threshold, and wherein the current pulses are supplied to the battery in a second charging phase, wherein each pulse is followed by a rest period during which no current is supplied to the battery.

9. The method according to claim 1 wherein the battery is a charge storage device.

10. The method according to claim 9 wherein the battery is a capacitor.

11. A battery charging device, comprising:
a power supply unit adapted to supply a constant current to a battery at a predetermined current value;
a control unit adapted to control the current supply to the battery such that current pulses are supplied to the battery, wherein each pulse is followed by a rest period during which no current is supplied to the battery, and wherein the control unit is further adapted to determine the state of charge of the battery during the rest period,
wherein the control unit further comprises an analog comparator for comparing the battery voltage to the predetermined voltage threshold, wherein the control unit is further adapted to measure a relaxation time from the start of the rest period until the time at which the analog comparator determines that the battery voltage has reached the predetermined voltage threshold.

12. The battery charging device according to claim 11, wherein the control unit is further adapted to measure the battery voltage during a rest period between two pulses and to determine that the battery is fully charged if the measured battery voltage is higher than or equal to a predetermined voltage threshold.

13. The battery charging device according to claim 12, wherein the control unit is further adapted to determine a pulse duration of a pulse of constant current and/or a charging current according to the battery voltage measured in the rest period preceding the pulse.

14. The battery charging device according to claim 12, wherein the control unit further comprises an analog-to-digital converter (ADC) for measuring the battery voltage, wherein the control unit is adapted to perform the voltage measurement with the ADC converter at the end of a rest period and to determine a voltage difference between the measured battery voltage and the predetermined voltage threshold.

15. The battery charging device according to claim 14, wherein the control unit is further adapted to determine a pulse duration of a pulse of constant current and/or a charging current according to the voltage difference determined in the rest period preceding the pulse.

16. The battery charging device according to claim 15, wherein the control unit is further adapted to set the pulse duration and/or the charging current according to an inverse relation to the determined relaxation time.

17. The battery charging device according to claim 16, wherein said inverse function is inversely proportional to the measured time $\Delta_{tn}$ such that $T_n = k/\Delta_{tn}$, wherein k is a constant, $T_n$ is duration of a pulse of constant current, and measured time $\Delta_{tn}$.

18. The battery charging device according to claim 17 wherein the measured time $\Delta_{tn}$ will be inversely related to the voltage difference $\Delta_{Vn}$ between the actual battery voltage and the target battery voltage.

19. The battery charging device according to claim 11 wherein said battery is a charge storage device.

20. The battery charging device according to claim 19 wherein said charge storage device said is a capacitor.

21. The battery charging device according to claim 19 wherein said charge storage device is a rechargeable battery.

22. The battery charging device according to claim 19 wherein said charge storage device is a Li ion battery.

* * * * *